United States Patent
Barnhard et al.

[19]

[11] Patent Number: 5,989,312
[45] Date of Patent: *Nov. 23, 1999

[54] MEMBRANE CONTROL SYSTEM AND PROCESS

[75] Inventors: Jeffrey Charles Barnhard, Williamsville; Brian Michael Meredith, Amherst; Edward Holmes Zander, E. Amherst, all of N.Y.

[73] Assignee: Praxair Technology, Inc., Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/775,848

[22] Filed: Dec. 31, 1996

[51] Int. Cl.$^6$ .................................................. B01D 53/22
[52] U.S. Cl. ........................ 95/8; 95/10; 95/14; 95/15; 95/18; 95/54; 96/4; 96/397; 96/421
[58] Field of Search .............................. 95/1, 14, 18, 19, 95/22, 23, 45, 47, 54, 8, 10; 96/4, 10; 55/210, 251, 271

[56] References Cited

U.S. PATENT DOCUMENTS

| | | |
|---|---|---|
| Re. 33,678 | 9/1991 | Campbell et al. ........................ 55/16 |
| 4,421,529 | 12/1983 | Revak et al. ............................ 95/54 |
| 4,787,919 | 11/1988 | Campbell et al. ........................ 55/16 |
| 4,806,132 | 2/1989 | Campbell .............................. 985/23 X |
| 4,944,776 | 7/1990 | Keyser et al. ......................... 95/19 X |
| 5,077,029 | 12/1991 | Schaub ................................. 423/351 |
| 5,102,432 | 4/1992 | Prasad ................................. 55/16 |
| 5,118,327 | 6/1992 | Nelson et al. ........................ 96/4 X |
| 5,131,929 | 7/1992 | Brockmann et al. ................... 96/4 X |
| 5,226,931 | 7/1993 | Combier .............................. 95/45 |
| 5,249,428 | 10/1993 | Barbe et al. ......................... 95/45 X |
| 5,266,101 | 11/1993 | Barbe et al. ......................... 95/23 |
| 5,281,253 | 1/1994 | Thompson ............................. 95/22 |
| 5,284,506 | 2/1994 | Barbe ................................. 95/23 |
| 5,290,341 | 3/1994 | Barbe ................................. 95/54 |
| 5,302,189 | 4/1994 | Barbe et al. ......................... 95/22 X |
| 5,388,143 | 2/1995 | Major et al. ......................... 95/54 X |
| 5,425,801 | 6/1995 | Prasad ................................ 95/15 |
| 5,429,662 | 7/1995 | Fillet ................................ 95/14 |
| 5,439,507 | 8/1995 | Barbe et al. ......................... 95/23 |
| 5,470,379 | 11/1995 | Garrett .............................. 95/54 X |
| 5,474,594 | 12/1995 | Khelifa et al. ...................... 95/18 X |
| 5,496,388 | 3/1996 | Tellier .............................. 96/4 X |
| 5,507,855 | 4/1996 | Barry ................................ 95/23 X |
| 5,582,030 | 12/1996 | Dannöhl ............................. 95/47 X |
| 5,588,984 | 12/1996 | Verini ............................... 95/18 X |

FOREIGN PATENT DOCUMENTS

0517570A1  12/1992  European Pat. Off. .

*Primary Examiner*—Robert Spitzer
*Attorney, Agent, or Firm*—Robert J. Follett

[57] ABSTRACT

A membrane system controller and control method for maximizing retentate product output and incorporating compressor load detection apparatus and process parameter instrumentation for feeding essential monitoring information to a control unit. Product output maximization is accomplished by increasing the membrane operating temperature during periods when compressor capacity is underutilized.

16 Claims, 5 Drawing Sheets

MEMBRANE CONTROL SYSTEM AND PROCESS

FIELD OF THE INVENTION

This invention relates to a controller and method and more particularly to a controller and method for controlling the operating temperature of a permeable membrane system in response to changes in potential feed gas generation capacity to correspondingly maximize total production output, while decreasing cost.

BACKGROUND OF THE INVENTION

Permeable membrane systems are widely recognized as a convenient and highly advantageous means for effecting gas separation on a relatively large scale. Such systems typically incorporate one or more permeable membranes having suitable permeability and selectivity characteristics for separating one or more component gases from a compressor-driven gas mixture feed. Such systems are used, e.g., in the separation of nitrogen, or oxygen (or both) from air. The retentate component (i.e. the gas which does not permeate the membrane) is typically the product, although it is possible to obtain (instead or in addition) an enriched or purified permeate product by providing one or more membrane separation stages. Membranes useful for this purpose include, without limitation, membranes permeable to oxygen, carbon dioxide, moisture, hydrogen, helium and the like.

Membrane separation performance is typically sensitive to both temperature and pressure. As operating temperature increases, membrane permeability increases as well, permitting more product to pass through the membrane. However, while membrane permeability increases with temperature, its selectivity decreases, thus requiring additional feed gas flow to maintain product (retentate) purity. As operating pressure increases, product purity rises due to an increased driving force pushing more gas through the membrane.

Striving to produce a relatively pure product at a specific flowrate within an expected range of ambient environmental conditions (temperature, pressure, humidity and air quality), conventional membrane system designs typically match compressor capacity with a required amount of membrane area at specific process conditions. Proper matching of the compressor to the membrane area is important in achieving cost-effective operation of the system. Also important is the balancing between capital investment (compressor size and membrane area) and power consumption costs.

In an effort to match compressors to membranes, those skilled in the art have realized that environmental parameters such as ambient temperature, relative humidity and barometric pressure all have varying effects on compressor capacity. Thus, compressors selected as feed gas generators are typically configured to operate at maximum volumetric capacity under worst case conditions. With these criteria in mind, the compressor's capacity is usually fully utilized at a design ambient temperature "$T_a$", typically the maximum ambient temperature within the expected range.

Conventional membrane systems operate under conditions that avoid the presence of any condensing liquids. Liquids, especially hydrocarbons, degrade membrane performance. For this reason, a predetermined minimum operating temperature ($T_O$) is typically selected to ensure superheating of all condensable feed components (humidity and pollutants) at low ambient temperatures. However, when the ambient temperature rises above $T_a$, the system operating temperature must increase above $T_O$ to maintain all components of the fluid mixture in a superheated condition and to avoid performance degradation of the membrane. In such a situation, the compressor capacity is fully utilized although the product supply rate falls.

In situations where the ambient temperature falls below $T_a$, the operating temperature of a conventional membrane system is typically maintained at the minimum threshold level $T_O$. This correspondingly affects the permeability of the membrane to a feed supply rate associated with that temperature. Because the density of the feed gas is higher at lower ambient environmental temperatures, the feed compressor has additional unused capacity. However, this unused capacity has not been exploited in the prior art. Instead of tapping into the increased capacity, conventional membrane systems often employ a "turn down" or bypass mode wherein the compressor output is controlled (decreased) to match the decrease in membrane permeability, which is also associated with the lower temperature. The prior art has failed to realize that "turndown" under these conditions actually results in higher production cost over a period of time.

Conventional gas separation membrane system designs that "turndown" the feed gas compressor during low demand periods often employ a controller responsive to certain demand parameters to increase or decrease feed gas flow from the compressor. Illustrative of such designs is U.S. Pat. No. 5,281,253, assigned to the assignee of the present invention. The controller typically includes means for monitoring and sensing at least one, and preferably all of the pressure, flowrate and product purity at the outlet line of the membrane system. Also included with the controller is a capacity control device to vary the compressor output. When changes in the monitored parameters occur, indicating a reduction in product demand, the compressor output is decreased to reduce power consumption. While this design is beneficial for its intended purpose, it fails to act upon process parameter deviations resulting from changes in process operating temperature and thus fails to take advantage of the virtually cost-free excess capacity in compressor feed gas flow associated with a decrease in ambient temperature.

Therefore, those skilled in the art have failed to recognize the need to provide a membrane system controller and control method for controlling a permeable membrane system to utilize the additional compressor capacity available during advantageous changes in ambient temperature (i.e. during cold winter months).

SUMMARY OF THE INVENTION

The membrane system controller and method of the present invention increases the production capacity of a permeable membrane gas separation system with insubstantial capital investment and negligible additional operating costs. These advantages are achieved by detecting the loading of the system compressor under certain specified conditions, and controlling the system operating parameters to maximize product output. As a result, production efficiency may be substantially improved without substantial additional cost.

The membrane system controller of the present invention may be used with a permeable membrane system employed to separate at least one gas component from a gaseous mixture. The membrane system includes a gas compressor operating at a predetermined optimal capacity. The compressor feeds the gaseous mixture to a membrane unit comprising (i) a controllable heating means to establish an operating temperature (which can be varied) and (ii) a permeable membrane having a permeability and product (purified gas) supply rate dependent upon the operating temperature. (The product may be the permeate or the retentate or both depending upon what is desired.) The controller comprises a load detection apparatus for sensing the actual loading of the compressor and generating an output signal representative of the loading. A control unit is connected to the heating means and includes an input connected to the detection apparatus and responsive to the load signal therefrom. Thus, when the compressor load decreases to correspondingly increase the fluid compressor capacity beyond the predetermined optimal capacity, the control unit causes the operating temperature to rise to a corresponding level to increase the membrane permeability and utilize the increased compressor capacity.

A method of the present invention for controlling a permeable membrane system utilizes excess capacity from a membrane system fluid compressor operating at a predetermined optimal load. The compressor feeds a membrane unit comprising (i) a controllable heating means to establish an operating temperature and (ii) a permeable membrane having a permeability and fluid component supply rate dependent upon the operating temperature. The method comprises the steps of detecting the actual loading of the compressor and raising the operating temperature of the membrane unit. These steps enable the system, when the loading decreases, to correspondingly increase the fluid compressor capacity beyond the predetermined optimal capacity, and to increase the membrane permeability and product supply rate, at a reduced unit operating cost.

BRIEF DESCRIPTION OF THE DRAWINGS

The above and other features of the present invention may be more fully understood from the following detailed description, taken together with the accompanying drawings, wherein similar reference characters refer to similar elements throughout and which.

DETAILED DESCRIPTION OF THE PREFERRED EMBODIMENTS

The controller and method of the present invention maximizes the production of a fluid component from a membrane system by utilizing excess compressor capacity realized by a decrease in compressor loading due to lower ambient temperature.

For convenience, preferred embodiments are described below by reference to a process for the separation of nitrogen from air using an oxygen selective membrane, i.e. a process in which nitrogen, the retentate, is the product. However, the invention can be readily adapted to the separation of any gaseous component (or components) from any gaseous mixture containing said component(s) as well as other gaseous constituents. Furthermore, the invention can be readily adapted to processes in which the permeate is the product (for example, in the case of air separation using an oxygen selective membrane an oxygen enriched product can be obtained by providing one or more membrane separation stages).

Figure 1:
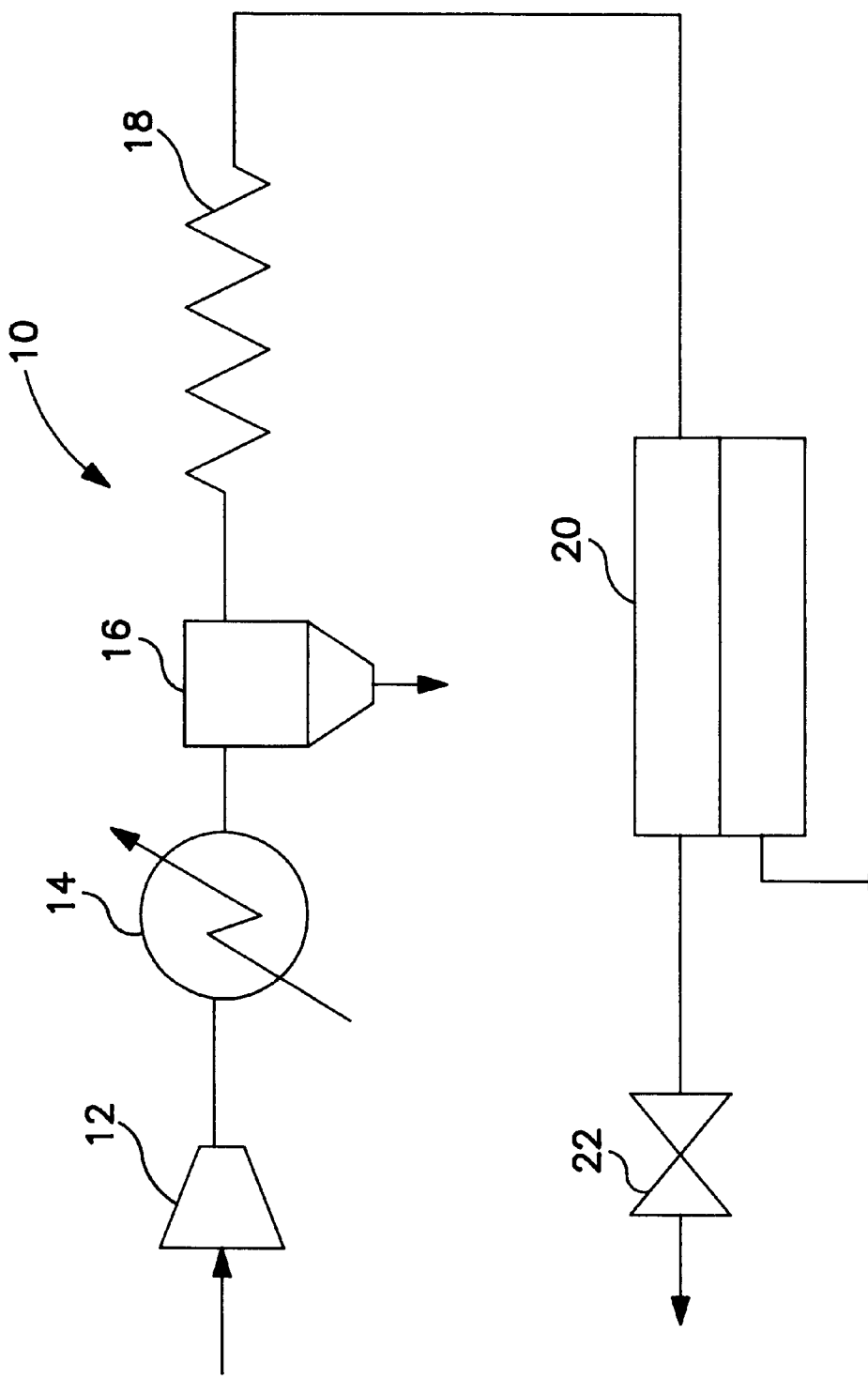
FIG. 1 is a schematic flow diagram illustrating a conventional permeable membrane system.

Referring now to the drawings, and more particularly FIG. 1, a conventional membrane system for the separation of nitrogen from air, generally designated 10, typically includes a fluid mixture compressor 12 which supplies the feed, an aftercooler 14, a moisture separator 16, a reheater 18, one or more membrane modules 20, and a product control valve 22. The membrane modules or bundles are often operated at a constant feed pressure and temperature to produce a specific flow and concentration of nitrogen. To maintain this criterion, the compressor is generally sized to supply the required gaseous mixture (e.g., air) to the membrane under given ambient conditions, typically 100° F. and 50% relative humidity. The term "ambient temperature" as used herein, is meant to represent the temperature of the gas entering the compressor. (Typically, of course, and especially in the case of air separation, the gas entering the compressor will be at ambient temperature. But the present invention is not limited to the gaseous mixture being at ambient temperature, but is applicable to any gaseous mixture entering the compressor at a temperature that is not constant but undergoes variations over time. A better term is the "compressor feed temperature". Nevertheless, "ambient temperature" will be used throughout the description of air separation herein.) However, if the actual ambient temperature is cooler than the design temperature, and the process parameters remain unchanged, the compressor will have extra (unused) capacity because of the increased density of the air mixture.

Figure 2:
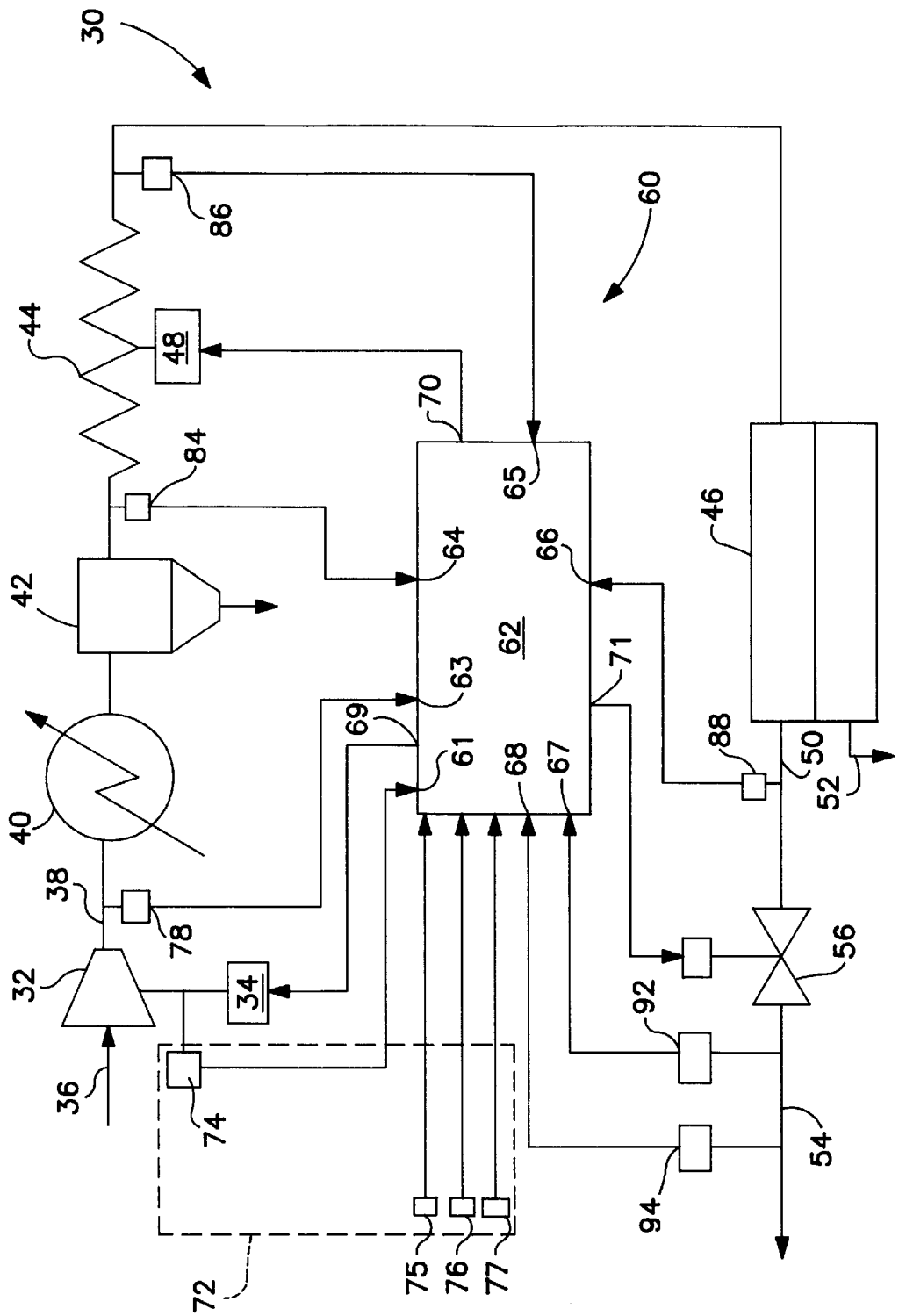
FIG. 2 is a schematic flow diagram illustrating a permeable membrane system incorporating the membrane system controller of the present invention.

Referring now to FIG. 2, the membrane controller of the present invention, generally designated 60, may be implemented in a permeable membrane system, generally designated 30, to detect the presence of the extra production capacity described above, and control the membrane system operating parameters to utilize the excess capacity.

An embodiment of the membrane system 30 in accordance with the membrane controller of the present invention 60 includes a fluid mixture compressor 32 having an output governed by a controllable limiter 34. Preferably, the compressor is of the rotary screw configuration with a suction throttle valve or slide valve to effect throttling or limiting of the output. An intake manifold 36 open to ambient conditions draws air into the compressor for subsequent pressurized discharge as a feed gas or fluid mixture.

Further referring to FIG. 2, the compressor includes an outlet comprising a discharge manifold 38 to exit and direct the pressurized feed gas mixture to an aftercooler 40 which lowers the temperature of the gas to assist a moisture separator 42 in extracting undesirable moisture from the fluid mixture.

The output of the moisture separator 42 feeds into a reheater 44 to increase the temperature of the feed gas to superheated conditions before reaching a membrane unit 46. Because membrane system performance and longevity is dependent upon operation substantially free of liquid (condensing) water, the feed air to the membrane unit must always be superheated. The heater typically includes a temperature adjustment mechanism, or heating means, 48, to increase, or decrease, the superheat temperature to an optimal membrane operating temperature in response to signals from the control unit 62. Typically, the operating temperature may be adjusted by controlling the flow of hot oil or glycol into a shell and tube heat exchanger, or by controlling the thermostat of an electric heater, but any other suitable heating means and temperature control can be employed.

Disposed downstream of the heater 44 is a gas inlet of the membrane unit 46 that includes one or more permeable membranes to separate the gaseous mixture into respective retentate and permeate component streams. (Either the retentate or the permeate (or both) can be the product, but in air separation the product is usually nitrogen, which is typically the retentate.) The membrane inherently includes a temperature-sensitive permeability representative of the rate at which the product can be supplied and generally sensitive to the operating temperature. The membrane also has a temperature and pressure sensitive selectivity, that affects the product purity level. The membrane selectivity is also typically dependent upon the system operating parameters. Respective retentate and permeate outlet manifolds 50 and 52 are disposed on the respective opposite sides of the membrane apparatus to maintain fluid component separation into the respective dominant $N_2$ and $O_2$ gases. To adjust product flow through a product delivery pipeline 54, a product control valve 56 is plumbed to the retentate outlet manifold 50.

With continued reference to FIG. 2, the membrane controller of the present invention 60 includes, generally, a control unit 62 and a load detection apparatus 72 for detecting unused compressor capacity as a function of compressor loading, and system instrumentation for feeding process parameter information to the control unit to monitor the fluid separation process and maximize compressor capacity utilization. The control unit 62 can be part of the overall controller for the process and need not be a separate unit.

In accordance with an embodiment of the membrane controller of the present invention, the control unit 62 includes a plurality of inputs 61, 63, 64, 65, 66, 67, and 68 to receive instrumentation outputs from the load detection apparatus 72 and system instrumentation preferably comprising a plurality of sensors, including those identified at 84, 86, 88, 92 and 94 as described below. Logic included in the control unit processes the measured feedback signals and generates control outputs 69, 70, and 71 for controlling operation of the compressor governor 34, reheater heating means 48, and flow control valve 56, respectively, to effect changes in the system process temperature and/or product flow rates. A programmable logic controller or computer is typically suitable for this purpose.

The load detection apparatus 72 preferably comprises a load sensing device 74 continuously detecting compressor loading. This may be accomplished, for example, by measuring the compressor output as a function of the compressor engine speed. The output feedback signal from the loading sensor is directed to the control unit input 61 and serves as the primary means for indicating changes in environmental parameters, thus indicating changes in compressor capacity. Alternatively, instead of providing a load feedback signal from the compressor, ambient parameter sensors 75, 76, and 77 are employed to measure ambient temperature, ambient barometric pressure, and ambient relative humidity, respectively. The respective signals are processed by the controller to calculate an expected loading condition on the compressor and effect changes in process operating parameters accordingly.

To sense the compressor outlet pressure and provide yet another means for detecting the compressor loading, a pressure transducer 78 is attached to the compressor discharge manifold 38 and is positioned in fluid communication with the fluid mixture (feed). This pressure sensor serves as a means for determining if the compressor is being overdrawn and also as an indicator of the system operating pressure. Overdrawing of the compressor arises when the membrane process requires more air than the compressor can deliver.

The system instrumentation as discussed above preferably comprises a plurality of sensors for the control unit 62 to monitor a variety of process operating parameters. Mounted upstream of the reheater 44 is an inlet temperature sensor 84 positioned in fluid communication with the feed gas stream and preferably comprising either a thermocouple or a resistance temperature device (RTD) to detect the temperature of the compressed air. The output of the temperature sensor is connected to the control unit input 64 to provide monitoring of the superheated feed gas, as described below. In response, the control unit ensures that the feed air to the membrane unit 46 is always at a temperature higher than the temperature upstream of the reheater.

A second temperature sensing device 86 is disposed at the inlet of the membrane unit to detect the membrane unit inlet temperature. Device 86 cooperates with the reheater inlet temperature sensor 84 to ensure superheating of the feed gas mixture to be contacted with the membrane unit 46, The sensed signal is fed to control unit input 65. Because the process or operating temperature of a membrane air separation process is typically defined as the average of the membrane inlet temperature and the product temperature, a third temperature sensing element 88 is preferably positioned in the retentate outlet manifold 50 for comparison to the membrane inlet temperature. Like the previously described instrumentation elements, the output of the operating temperature sensor is fed to the control unit input 66 for production capacity maximization.

To sense the delivery pipeline pressure, indicative of the required product flow rate, a pressure sensor 92 is positioned downstream of the product control valve 56. The output connects to the control unit input 67 to effect changes in plant product output flow, if required. Also disposed downstream of the product valve is a sensor 94 for measuring the nitrogen concentration in the product to ensure steady state operation of the fluid separation process before process temperature or product flow rate changes are made. (It will be understood that if the product is oxygen, an oxygen sensor would instead be provided at the permeate stream. It is of course also possible to measure the purity of one stream and derive that of the other.)

The membrane controller 60 of the present invention may be employed in newly constructed gas separation facilities, or conveniently installed as an improvement in existing plants incorporating controllable compressors, heating units and flow valves. Straightforward techniques for installing the required pressure and temperature sensors are well known to those skilled in the art, as are the procedures necessary to wire and implement the control unit.

During operation, and since the ambient temperature is continuously changing, the membrane controller 60 must monitor the compressor loading as indicated by the feedback loading signal or the sensed environmental and process parameters, and make necessary corrections to the operating temperature to optimize the use of available compressed air. If the operating temperature is too high for a given ambient temperature, then the air compressor will be unable to supply the required air and the required product purity cannot be maintained (or the product purity must fall). Conversely, if the operating temperature is too low for a given ambient temperature, then the plant will not be able to utilize all of the available compressed air, and will not make the maximum possible product flow.

Figure 3:
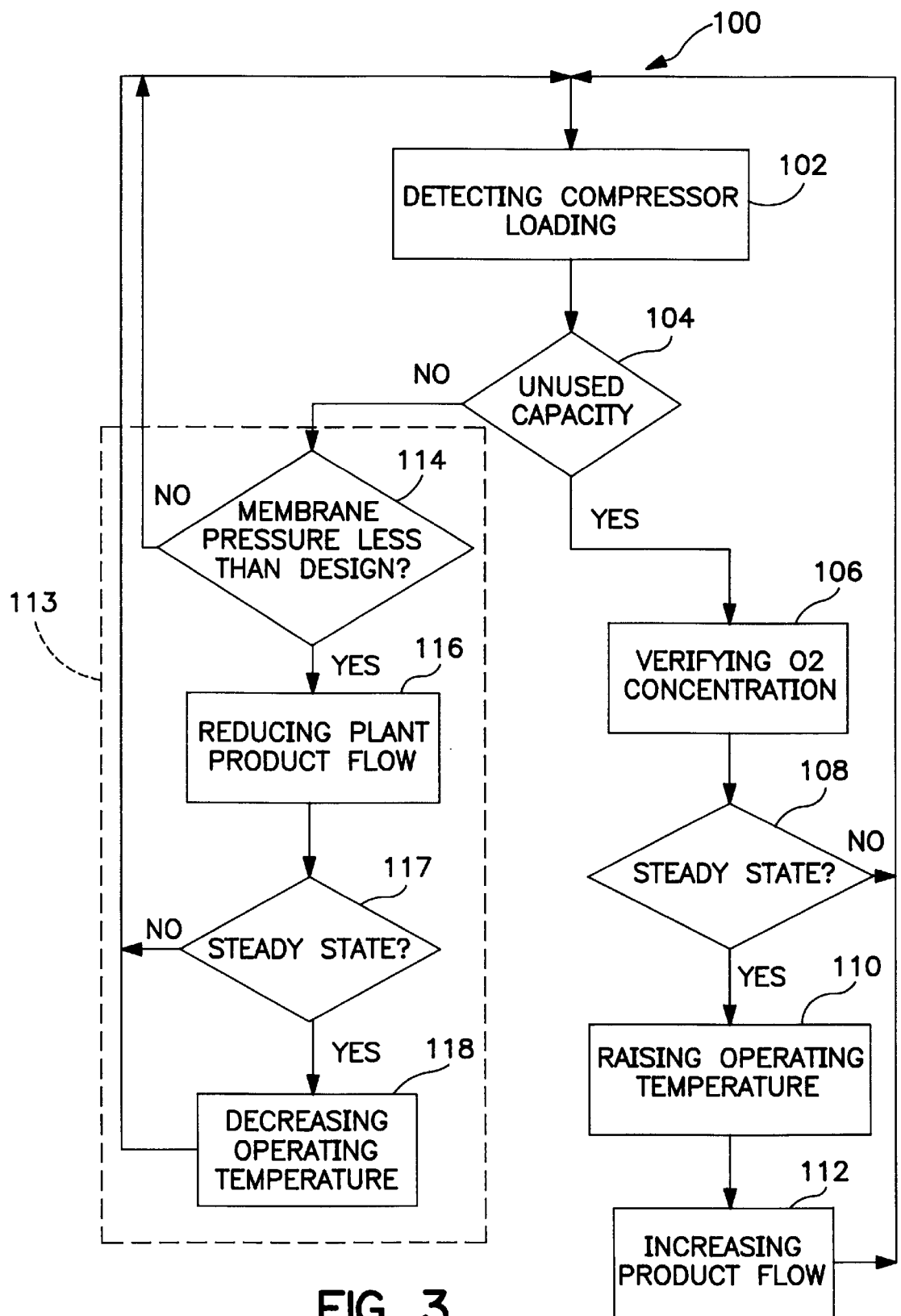
FIG. 3 is a function diagram illustrating the steps included in a first embodiment of the control method of the present invention.

Referring now to FIG. 3, and in accordance with a first embodiment of the method of the present invention, generally designated 100, the operating temperature of the membrane air separation plant may be continuously adjusted to maximize the utilization of available compressed air. This is accomplished by, as shown in step 102, first detecting the actual loading of the compressor 32 (FIG. 2), and determining the unused capacity based upon the detected signal, shown in step 104. If there is a condition indicating unused compressor capacity, the next step 106 includes verifying that the purity of the product gas is within specification. Care should be taken that the detection and verification steps are carried out under substantially steady state conditions, as shown in step 108. To insure steady state conditions, it is preferred to take detection and verification measurements often. These values should remain substantially constant for about one hour before steady state is assumed, and before the values obtained are used to modify process parameters.

Following the detection 102 and verification 106 steps, under steady state conditions, if the compressor 32 is not fully loaded and the oxygen level is within specification, the method 100 continues by raising the process operating temperature an incremental amount, typically up to 2° F., as shown in step 110. The increase in operating temperature increases the permeability of the membrane unit and results in more air being processed. If the feed flow rate remains constant, the $N_2$ product purity will increase. However, the system will then compensate, since product purity should not be altered (it is usually customer specified).

To compensate for the product purity exceeding specifications brought on by the temperature induced increase in membrane permeability, a step of increasing product flow 112 is implemented until the product purity falls within the specification. At this point, if the compressor capacity remains underutilized, the method returns to the detection step 102 for additional iterations.

Further referring to FIG. 3, to return the membrane system capacity back to optimal levels when the ambient temperature increases, the membrane control method of the present invention 100 provides additional steps to utilize all available compressed air efficiently by matching the membrane operating temperature with the available compressed air at all times. The additional steps, defining an "air limited" sub-process 113, reduce the plant's product capacity as the ambient temperature rises and the membrane process requires more air than the compressor can produce.

After carrying out the detecting and determining steps 102 and 104, respectively, if the air compressor 32 is fully loaded, the membrane pressure is then measured at step 114 to compare against the expected operating pressure. If the operating pressure is less than expected, the membrane process requires more air than the compressor can supply and the compressor becomes "air limited". In this situation, the product purity will drift above the design value if the product flow remains the same. Correction of the problem begins by reducing the plant product flow, as shown in step 116, a specified amount. After the plant reaches steady state operation, shown in step 117, the method continues by also decreasing the operating temperature, shown in step 118, by an incremental amount, typically up to 2° F. If, after the system reaches steady state operation, the air limiting condition persists, the steps of sub-process 113 are repeated.

The preceding procedures describe a control method of the present invention for utilizing all available compressed air in the most efficient manner by matching the membrane operating temperature with the available compressed air at all times (increasing the membrane operating temperature when the ambient temperature decreases). Moreover, while the method disclosed above emphasizes nitrogen as the product, or retentate, the method is equally applicable to a variety of fluid selective membranes used to retain $CO_2$, $O_2$, $H_2O$, $H_2$, and He. Moreover, it should be understood that any separated fluid component may be utilized as a product stream. This is especially true for multi-stage configurations comprising more than one membrane stages. However, there will likely be times when full production capacity is undesirable. In such circumstances, the control method must be able to allow the plant to run in the most efficient manner at any customer demand level.

The control method of the present invention may be combined with a conventional process for controlling a membrane separation plant efficiently at any customer demand level by reducing the membrane operating pressure as the required product flow rate decreases. To effect the demand sensitive process, a given operating temperature is selected and a "control line" relationship constructed such that for every possible specified flow rate there is a corresponding membrane pressure that will produce the required product purity. The relationship may be programmed into the membrane system controller 60 to conveniently monitor and control the process.

Figure 4:
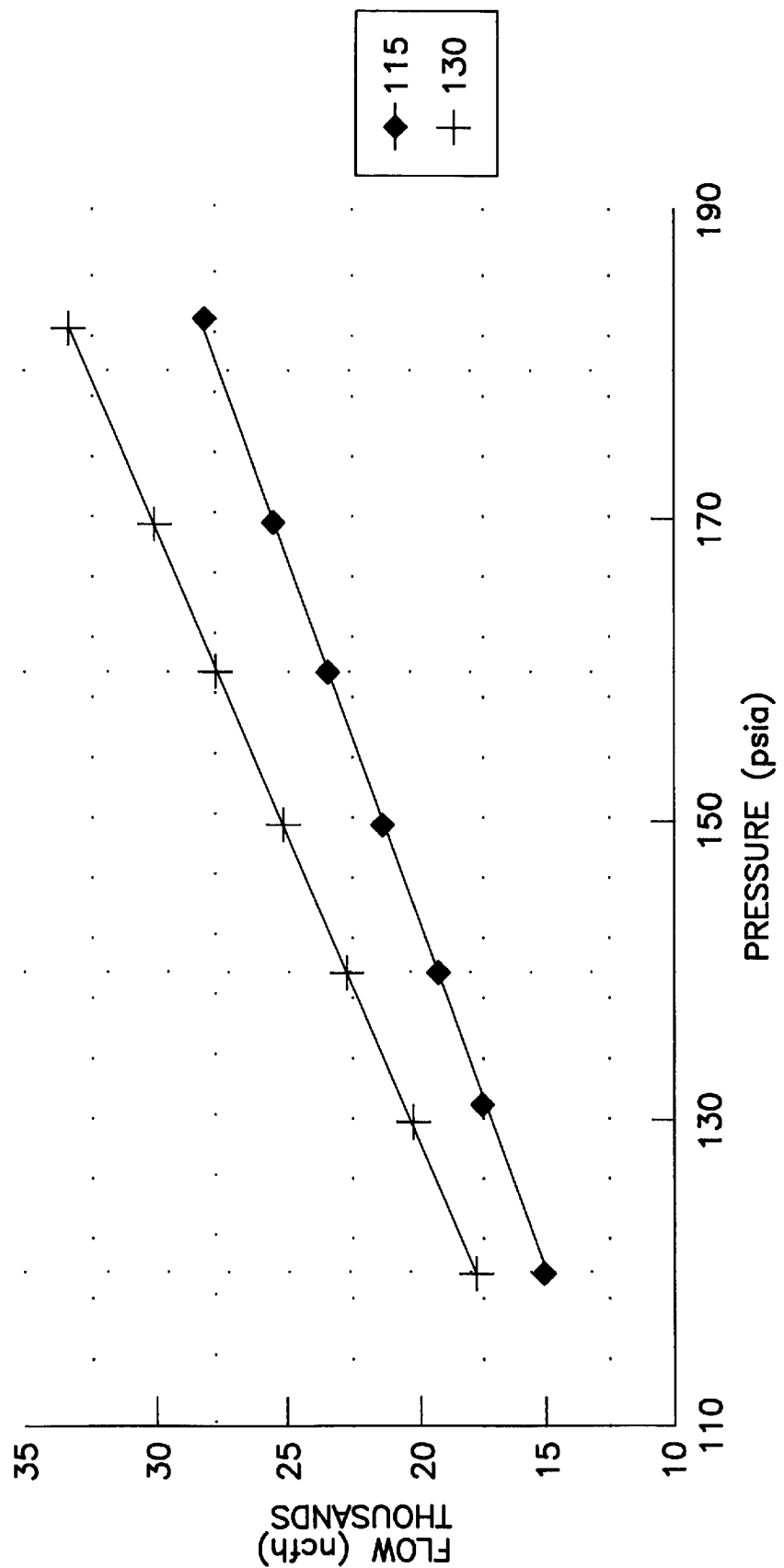
FIG. 4 is a graphical illustration of membrane flow as a function of membrane pressure for two different operating temperatures.

Control lines for use in conventional systems employing constant operating temperature "turndown" control systems are typically experimentally derived by operating the plant at two different flow rates with the process pressure varied at each flow rate until the desired product purity is achieved. FIG. 4 depicts typical control lines for two different operating temperatures. The following two equations are then solved for the slope and intercept of the control line, which are then implemented in the controller software:

$$(P)1 = (FLOW)_1 \times M + B \qquad \text{Equation (1)}$$

$$(P)2 = (FLOW)_2 \times M + B \qquad \text{Equation (2)}$$

Where:

$P_{1,2}$=Membrane pressure at two different (specified) flows $FLOW_{1,2}$=retentate flow M=control line slope B=control line intercept Because typical control lines fail to account for a varying system operating temperature, a function of both temperature and pressure must be created to derive a similar control line for the controller and method of the present invention to determine the required membrane pressure. The inventors have discovered that the following empirical formula describes the relationship between product flow and process operating temperature at a constant pressure and product purity:

$$\frac{FLOW_1}{FLOW_2} = e^{E\left(\frac{1}{T_2} - \frac{1}{T_1}\right)} \qquad \text{Equation (3)}$$

where:

$FLOW_{1,2}$=retentate flow

E=temperature correction constant $T_1$=temperature corresponding to $FLOW_1$ (°R)

$T_2$=temperature corresponding to $FLOW_2$ (°R)

Equations 1 and 2 can be solved for the slope and intercept relating membrane pressure to membrane flow at a base operating temperature $T_b$:

$$P = Flow \times M + B \qquad \text{Equation (4)}$$

Where:
flow=membrane retentate flow
P=membrane pressure
M=Slope @$T_b$
B=Intercept @$T_b$ Solving equation 4 for flow and substituting the resultant expression into equation 3 for $FLOW_1$, and rearranging yields:

$$P = FLOW \times e^{E\left(\frac{1}{T} - \frac{1}{T_b}\right)} \times M + B \qquad \text{Equation (5)}$$

Where:
P=membrane pressure
T=current operating temperature
$T_b$=base temperature
M=slope calculated @$T_b$
B=Intercept calculated @$T_b$
E=temperature correction constant The temperature correction constant E can either be derived or determined experimentally. Calculating the constant E can be done by, for example, modeling the membrane process at different temperatures and pressure combinations of constant purity. To determine the constant experimentally, the plant operating temperature must be changed to a temperature other than $T_b$. Then the plant flow and pressure are set such that the retentate concentration is at the desired composition. The following formula 6 (from a rearrangement of equation 5) can then be used to determine the temperature correction factor, E:

$$E = \frac{\ln \frac{P-B}{FLOW \times M}}{\left(\frac{1}{T} - \frac{1}{T_b}\right)} \qquad \text{Equation (6)}$$

Using equation 5 and the temperature correction factor calculated from equation 6, the membrane pressure required to maintain constant product purity can be calculated for any temperature and flow combination. Those skilled in the art will recognize that if $T=T_b$, then the exponential term drops out of equation 5 and it takes the form of equations 1 and 2. This would be expected since equations 1 and 2 are isothermal control line equations.

Once the control line is calculated, it may be programmed into the membrane system controller 60.

Operating the membrane plant at the proper membrane operating pressure is important for maintaining the desired retentate purity while reducing and preferably minimizing the power consumed by the plant. If the ambient temperature is low and the plant controls have increased the operating temperature to accept the maximum flow from the compressor and the customer demand falls, the required membrane pressure must be calculated with equation 5 to correct for the current operating temperature in order to maintain constant product purity. If a plant used the control line for the lower base temperature, the membrane pressure would be too high for a given flow rate resulting in inefficient operation. At the other extreme, using the control line at a higher base temperature to determine the appropriate membrane pressure would cause the pressure to be too low, resulting in higher than desired oxygen concentration in the product.

Consistent with the teachings of the present invention, another application of the membrane controller and method involves use with membrane systems that operate at substantially constant ambient temperature environments, but often require different purities at different times. As purity requirements change, the controller determines the desired purity level and detects the difference between the desired purity and the actual purity level. Depending on the detected purity, the compressor load is changed to correspondingly change the volume of feed gas. At the same time, the operating temperature is correspondingly modified to utilize the increased capacity of the system, and change the actual purity to the desired purity. Table I reproduced below, illustrates the relative amount of production capacity available comparing a membrane system utilizing the control method of the present invention, throughout a defined purity range, against a conventional system designed for 95% oxygen free product using a constant membrane temperature.

TABLE I

| Purity (%) | 95 | 97 | 99 | 99.5 |
|---|---|---|---|---|
| Flow Enhancement | 1.0 | 1.15 | 1.40 | 1.50 |

Figure 5:
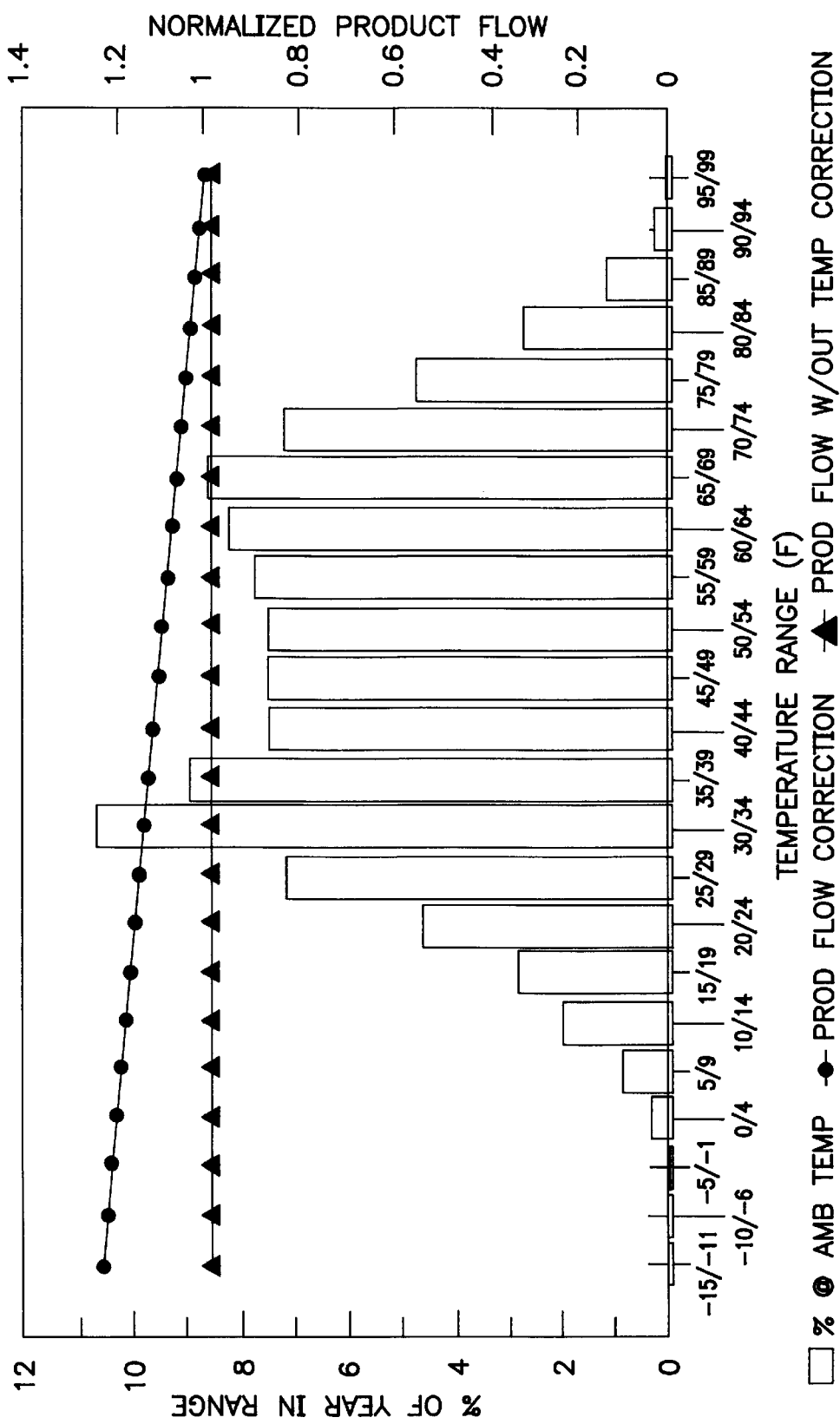
FIG. 5 is a graphical illustration showing the increased capacity resulting from the implementation of the membrane system controller and method of the present invention.

Those skilled in the art will appreciate the substantial reduction in customer costs that result from implementation of the membrane system controller and method of the present invention. As shown in FIG. 5, by taking advantage of the increase in compressor capacity that results from seasonal weather changes and other variations in ambient (or compressor feed) temperature, the average annual capacity (tons of nitrogen produced per year) of an air separation plant operated in the Northeastern United States could increase by approximately ten percent. This increase avoids using the equivalent amount in liquid nitrogen which is considerably more expensive than the gaseous nitrogen produced using the membrane system. The net result could easily be a 20% reduction in overall product unit costs. In a mature and competitive industrial gases industry, even a 5% cost savings is very significant. Of course, the cost benefit obtained by adjusting the membrane operating temperature according to the controller and method of the present invention will depend on the ambient temperature profile in the plant's geographic location.

The membrane system controller and method of the present invention also offers a substantial increase in production capacity for most existing gas separation plants without requiring cost-prohibitive modifications to existing facility hardware. As disclosed herein, the instrumentation required to effect process parameter monitoring and control is adaptable to most fluid flow facility environments. Likewise, the minimal effort required to wire and install the control unit is especially advantageous.

While the preferred embodiments have been described and illustrated, various substitutions and modifications may be made thereto without departing from the spirit and scope of the invention. Accordingly, it is to be understood that the present invention has been described by way of illustration and not limitation.

We claim:

1. A method of controlling a permeable membrane system for separating at least one gas product from a gaseous mixture to utilize excess capacity from a membrane system feed compressor operating at a predetermined optimal load for feeding said gaseous mixture to a membrane unit having a controllable heating means to establish a variable operating temperature and a permeable membrane having a permeability and product gas supply rate dependent upon said operating temperature, said method including the steps of:

detecting the actual loading of said compressor;

determining the level of compressor capacity that is unused; and raising said operating temperature, when said determining step indicates unused compressor capacity, to increase said membrane permeability.

2. A method of controlling a permeable membrane system according to claim 1 wherein:

said detecting step includes detecting an operating pressure of said membrane unit.

3. A method of controlling a permeable membrane system according to claim 1 wherein:

said detecting step includes sensing one or more of temperature of said gaseous mixture entering said compressor, pressure of said gaseous mixture entering said compressor and relative humidity of said gaseous mixture entering said compressor and calculating said compressor loading based upon one or more of said temperature, said pressure and said relative humidity of said gaseous mixture entering said compressor.

4. A method of controlling a permeable membrane system according to claim 1 wherein after said step of determining the level of compressor capacity that is unused, said method further includes the steps of:

reducing the flow of said at least one gas product when said compressor capacity is fully utilized; and decreasing said operating temperature to correspondingly decrease said membrane permeability and correspondingly increase the purity of said at least one gas product.

5. A method of controlling a permeable membrane system according to claim 4 and further including the steps of:

sensing demand of product flow to determine a desired flow rate;

varying membrane operating pressure as a function of said operating temperature and said product flow rate, as said demand changes, to maintain said product purity at a required level at said flow rate.

6. A method of controlling a permeable membrane system for separating a gas component from air, said gas component defining a product having a predetermined purity, to utilize excess capacity from a membrane system air compressor operating at a predetermined optimal load for feeding said air to a membrane unit having a controllable heating means to establish a variable operating temperature and a permeable membrane having a permeability and product supply rate dependent upon said operating temperature, said method including the steps of:

detecting the actual loading of said compressor;

determining the level of unused compressor capacity; and raising said operating temperature, when said determining step indicates unused compressor capacity, to increase said membrane permeability, and said product supply rate.

7. A method according to claim 6 wherein said product comprises nitrogen, and said membrane is selectively permeable to oxygen.

8. A method of controlling the purity level of at least one gas product separated from a gaseous mixture by a permeable membrane system, said system including a membrane system feed compressor operating at a predetermined optimal load for feeding said gaseous mixture to a membrane unit having a controllable heating means to establish a variable operating temperature and a permeable membrane having a permeability and product gas purity dependent upon said operating temperature, said method including the steps of:

determining the difference between a desired product gas purity and an actual product gas purity;

changing the load on said compressor to change the volume of said gaseous mixture; and modifying said operating temperature to alter said membrane permeability and change said actual product gas purity to said desired gas purity.

9. A membrane system controller for use with a permeable membrane system for separating gases from a gaseous mixture, the system having a gas compressor operating at a predetermined capacity optimized with respect to a given design temperature to feed the gaseous mixture at a predetermined operating pressure to a membrane unit having a controllable heating means to establish an operating temperature and a permeable membrane having a permeability and product gas supply rate dependent upon said operating temperature, said controller comprising:

a load detection apparatus for detecting the actual loading of said compressor and generating an output ambient parameter signal representative of said loading; and a central control unit having an input interface connected to said load detection apparatus and a control output connected to said heating means and responsive to said output ambient parameter signal representative of said loading such that when said actual loading decreases, thus correspondingly increasing capacity in said gas compressor beyond said predetermined capacity to a higher capacity, said operating temperature is raised a corresponding amount thereby increasing said membrane permeability and utilizing said higher capacity.

10. A membrane system controller according to claim 9 wherein:

said load detection apparatus is disposed in fluid communication with said gaseous mixture being fed for measuring said operating pressure and producing an output signal representative of said operating pressure.

11. A membrane system controller according to claim 9 wherein:

said control unit comprises a programmable logic device and including:

memory for storing and retrieving a plurality of preprogrammed process steps;

instrumentation for measuring said operating temperature, and product purity; and a control output connected to said compressor to control output of said compressor.

12. A membrane system controller according to claim 11 wherein:

said programmable logic device comprises a computer.

13. A membrane system controller according to claim 9 wherein:

said load detection apparatus comprises at least one sensor for sensing and generating a signal representative of at least one of gaseous mixture temperature entering the compressor, relative humidity of said gaseous mixture entering the compressor and pressure of said gaseous mixture entering the compressor; and said control unit including logic to calculate said compressor loading based upon said signal.

14. A membrane system controller for use with a permeable membrane system for separating a gas component from air, said gas component having a predetermined purity and defining a product, the system having an air compressor operating at a predetermined capacity optimized with respect to a given design temperature to feed the air at a predetermined operating pressure to a membrane unit having a controllable heating means to establish an operating temperature and a permeable membrane having a permeability and product supply rate dependent upon said operating temperature, said controller comprising:

a load detection apparatus for detecting the actual loading of said compressor and generating an output ambient parameter signal representative of said loading; and a central control unit having an input interface connected to said load detection apparatus and a control output connected to said heating means and responsive to said output ambient parameter signal representative of said loading, such that when said loading of said compressor decreases, thus correspondingly increasing said air compressor capacity beyond said predetermined capacity to a higher capacity, said operating temperature is raised a corresponding amount thereby increasing said membrane permeability and utilizing said higher capacity to increase said product supply.

15. A permeable membrane system according to claim 14 wherein;

said product is purified nitrogen.

16. A permeable membrane system according to claim 14 wherein:

said membrane unit comprises multiple stages having multiple permeable membranes and said product is oxygen.

* * * * *